No. 843,377. PATENTED FEB. 5, 1907.
J. W. ULLRICH, Jr. & J. W. MAIERHOFER.
SPEED REGULATOR.
APPLICATION FILED OCT. 24, 1906.
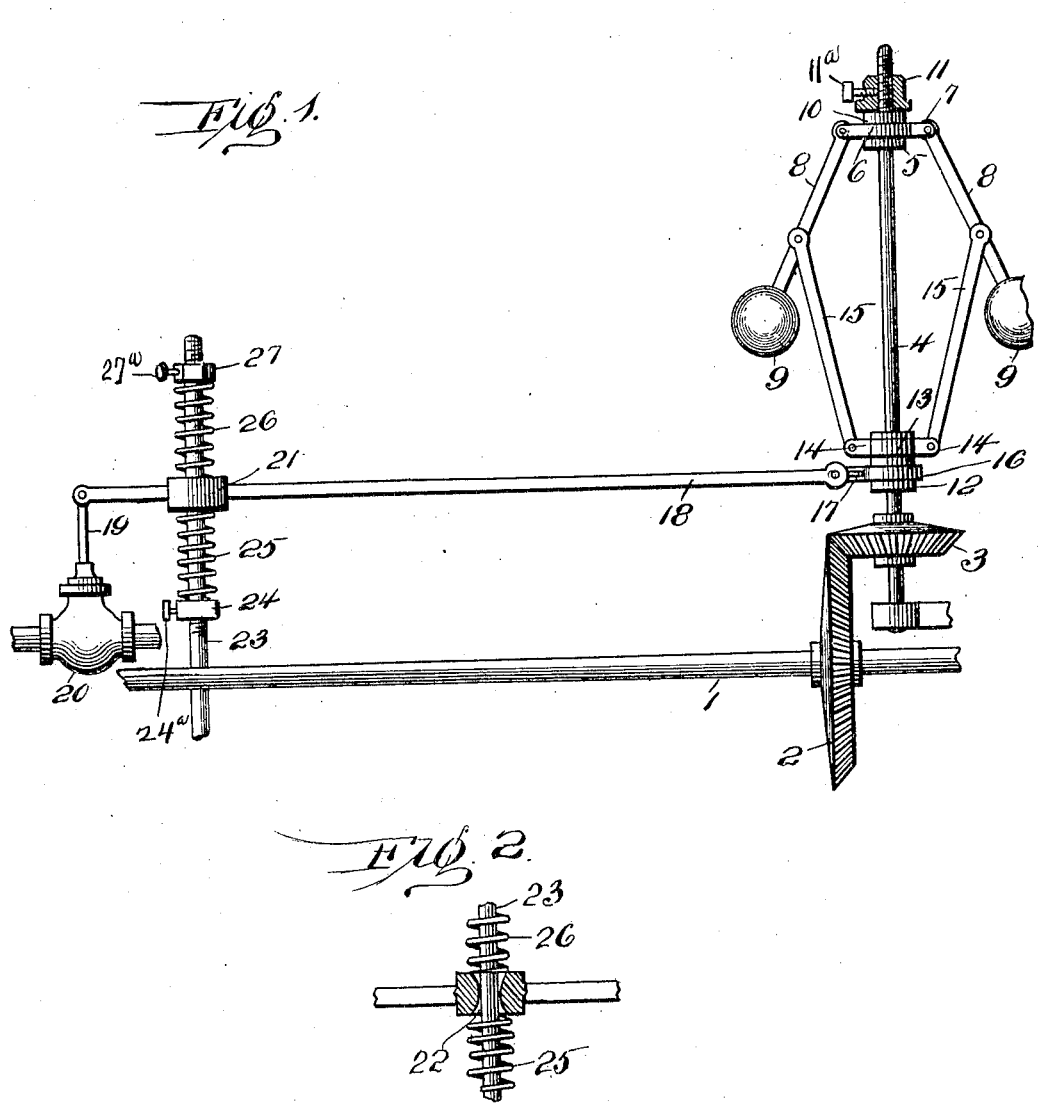

UNITED STATES PATENT OFFICE.

JOHN W. ULLRICH, JR., AND JOHN W. MAIERHOFER, OF ALLEGHENY, PENNSYLVANIA.

SPEED-REGULATOR.

No. 843,377.          Specification of Letters Patent.          Patented Feb. 5, 1907.

Application filed October 24, 1906. Serial No. 340,350.

*To all whom it may concern:*

Be it known that we, JOHN W. ULLRICH, Jr., and JOHN W. MAIERHOFER, citizens of the United States of America, residing at Allegheny, in the county of Allegheny and State of Pennsylvania, have invented certain new and useful Improvements in Speed-Regulators for Automobiles, of which the following is a specification, reference being had therein to the accompanying drawings.

This invention relates to speed-regulators for automobiles; and its object is to provide simple and effective mechanism for regulating the speed of a motor-vehicle automatically.

The invention comprises the combination with the driving-axle of a motor-vehicle, of a ball-governor, a valve, and novel connecting devices between said valve and governor for controlling the valve, and thereby regulating the speed of the vehicle.

The construction of the improvement will be fully described hereinafter in connection with the accompanying drawings, which form a part of this specification, and its novel features will be defined in the appended claims.

In the drawings, Figure 1 is an elevation of the improvement shown in connection with a motor-vehicle and valve-casing, and Fig. 2 is a detail sectional view.

The reference-numeral 1 designates the driving-axle of a motor-vehicle upon which is mounted a bevel gear-wheel 2, meshing with a bevel gear-pinion 3, mounted upon a vertically-disposed governor-shaft 4, suitably supported adjacent to the axle 1. Upon the shaft 4 adjacent to its upper end is secured a collar 5, upon which is supported the pivotal support of the governor comprising a ring 6, having diametrically opposite pairs of perforated lugs 7, between which are pivotally secured the diverging arms 8 of the governor, carrying balls 9 at their lower ends. Above the ring 6 is a washer 10, secured by a hexagonal nut 11, fitting upon the threaded upper end of the shaft 4 and held by a set-screw 11$^a$. Upon the shaft 4 is loosely supported a sleeve 12, formed with two parallel annular grooves. Within the upper of the two grooves is secured a ring or band 13, having diametrically opposite perforated lugs 14, between which are pivotally secured the lower ends of oppositely-arranged links 15, the upper ends of said links being pivotally secured to the governor-arms 8.

Within the lower annular groove of the sleeve 12 is secured a band 16, the ends 17 of which are loosely connected to one end of a rod 18, the opposite end of which is pivotally secured to the valve-stem 19 of a valve-casing 20. The rod 18 is formed with an integral bearing 21, formed with a bore 22 oppositely flared at its ends, as shown in Fig. 2, to receive a rod 23, fixed at its lower end to the frame of the machine and having a collar 24 below the rod 18, adjustably held by a set-screw 24$^a$.

A coil-spring 25 surrounds the rod 23 between the collar 24 and the under side of the bearing 21, and a similar spring 26 surrounds the rod 23 above the bearing 21, one end of the spring resting on said bearing and the other end against a nut 27, fitting the upper end of the rod and held by a set-screw 27$^a$.

The operation of the mechanism constructed as thus described will be readily understood.

When the speed of the vehicle becomes excessive, the rapid revolution of the axle 1 will spread the governor-arms 8 through the intermediacy of the gearing, the sleeve 12, and the links 15. The upward movement of the sleeve 12 raises the adjacent end of the rod 18 and depresses the opposite end thereof to close or partially close the valve through the stem 19.

The rod 23 serves as a guide for the connecting-rod 18, and the coil-springs surrounding said rod take up the jar incident to travel and the vibration of the rod 18.

What we claim, and desire to secure by Letters Patent, is—

1. The combination with the driving-axle of a motor-vehicle, of a vertically-disposed shaft arranged adjacent thereto, bevel-gears connecting said shafts, a slidable sleeve on said vertical shaft, a ball-governor mounted on the vertical shaft, links connecting the arms of the governor to said sleeve, a rod connected at one end to the stem of the power-controlling valve of the vehicle, and at its opposite end to said sleeve, a bearing formed integral with said rod, a vertical rod extending through said bearing, and springs surrounding said vertical rod on opposite sides of said bearing.

2. The combination with the driving-axle of a motor-vehicle of a vertically-disposed shaft arranged adjacent thereto, bevel-gears connecting said shafts, a slidable sleeve on said vertical shaft, a ball-governor mounted on the vertical shaft, links connecting the arms of the governor to said sleeve, a rod connected at one end to the stem of the power-controlling valve of the vehicle, and at its opposite end to said sleeve, a bearing formed integral with said rod, a vertical rod extending through said bearing, springs surrounding said vertical rod on opposite sides of said bearing, and means for supporting and tensioning said springs.

In testimony whereof we affix our signatures in the presence of two witnesses.

JOHN W. ULLRICH, JR.
JOHN W. MAIERHOFER.

Witnesses:
MAX H. SROLOVITZ,
F. O. MCCLEARY.